Figure 1:
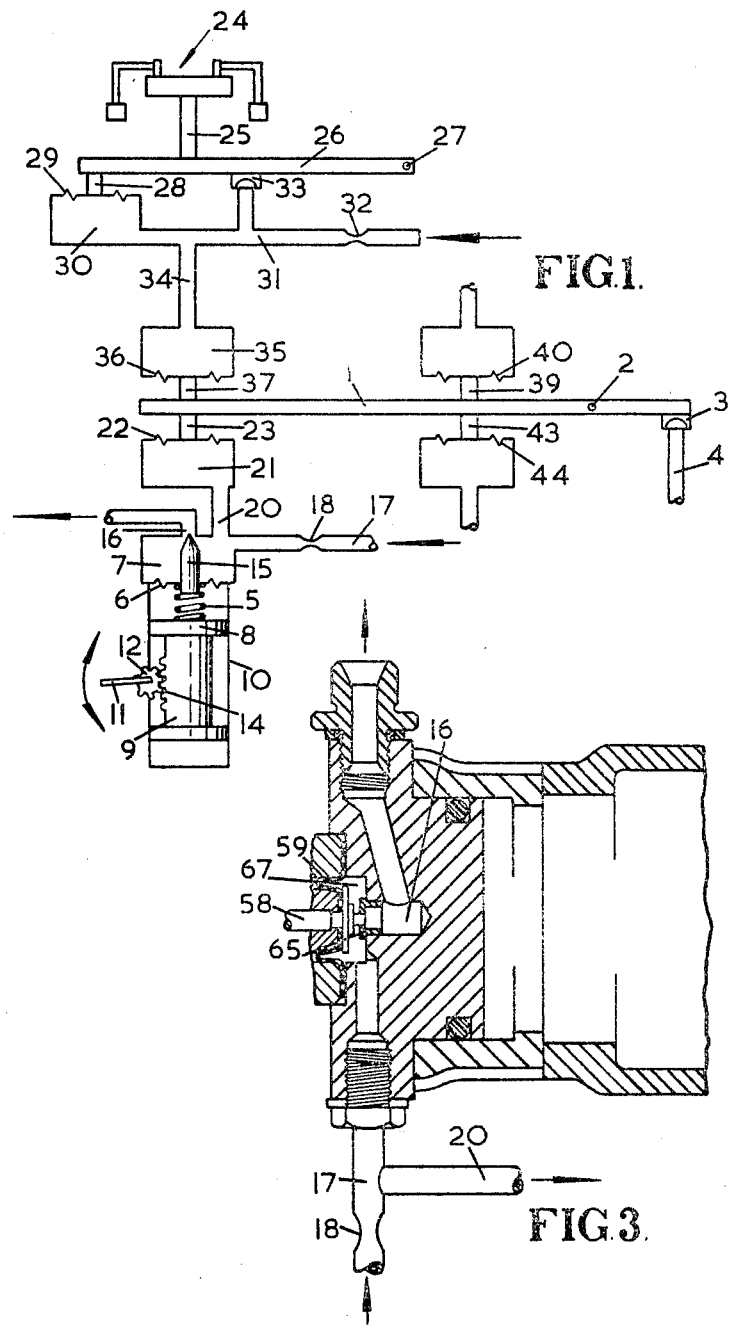

United States Patent Office 3,277,911
Patented Oct. 11, 1966

3,277,911
GOVERNOR CONTROL FOR A FUEL SYSTEM OF A GAS TURBINE ENGINE
Robin M. Dakin, Coventry, England, assignor to Bristol Siddeley Engines Limited, Bristol, England
Filed Oct. 2, 1963, Ser. No. 313,291
Claims priority, application Great Britain, Oct. 4, 1962, 37,493/62
6 Claims. (Cl. 137—29)

The invention relates to a governor control, for a fuel system of a gas turbine engine, of the kind in which a valve member, e.g. a half-ball, arranged to control the fuel supply to the engine, is carried by a pivotally-mounted arm, which is maintained substantially in balance, when the engine is operating at its governed speed, by opposed forces acting on it and produced on the one hand by means responsive to engine speed and on the other hand by spring means.

When the force produced by the spring means is directly applied to the arm, the accuracy and sensitivity of the governor are impaired, because due to the rate of the spring, i.e., the variation of spring force as the spring is compressed, the force acting on the arm will change as the arm moves. A similar "rate effect" will be produced if the speed-responsive means includes centrifugally-operable weights and the force produced thereby acts directly on the arm. These rate effects will restrict the movement of the arm when deviation from the governed speed occurs and hence affect the true operation of the arm. An object of the invention is to provide a governor control in which the aforesaid rate effects are reduced or eliminated so that high sensitivity and accuracy can be achieved.

According to the invention, the said spring means is arranged to act indirectly on the pivotally-mounted arm in a substantially rateless manner by controlling the pressure of a fluid acting on fluid-operable means arranged to engage the said arm.

Where the said speed-responsive means would otherwise introduce a rate effect, the speed-responsive means is also arranged to act indirectly on the pivotally-mounted arm in a substantially rateless manner by controlling the pressure of a fluid acting on further fluid-operable means arranged to engage the said arm.

The said spring means is preferably arranged to act between an abutment and a member movable in response to fluid pressure within a chamber, supplied via a restrictor with pressurised fluid, the said pressure-responsive member also being arranged to operate a valve member for controlling an outlet orifice from the chamber and the said fluid-operable means being responsive to the pressure within the chamber.

In this arrangement, the fluid pressure within the chamber is substantially proportional to the spring force and is controlled to balance the latter, regardless of movement of the fluid-operable means, thereby resulting in a force, substantially unaffected by movement of the spring, being applied to the arm.

Similarly, the speed-responsive means may act on a member movable in response to fluid pressure within a second chamber, supplied via a restrictor with pressurised fluid, the latter pressure-responsive member also being arranged to operate a valve member for controlling an outlet orifice from the second chamber and the said further fluid-operable means being responsive to the pressure within the second chamber and acting on the arm in opposition to the first-mentioned fluid-operable means.

Figure 2:
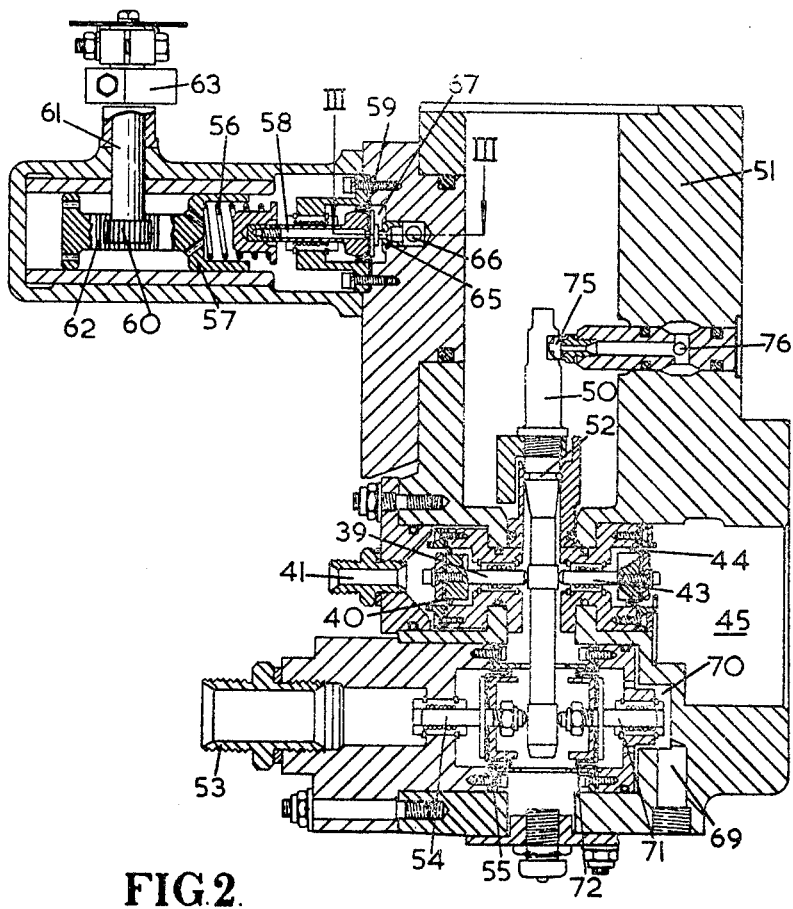

By way of example one arrangement of governor control for a fuel system for a gas turbine engine in accordance with the invention will now be described with reference to the accompanying drawings, in which:

FIGURE 1 is a diagrammatic sketch of the governor control,
FIGURE 2 is a sectional view of part of the governor control shown in FIGURE 1, and
FIGURE 3 is a section to a larger scale on the line III—III in FIGURE 2.

Referring firstly to FIGURE 1, the governor control comprises an arm 1, mounted on a pivot 2 and carrying a half-ball valve 3, which controls the flow of fuel or a servo-fluid from a pipe 4. The flow of fuel or servo-fluid through the pipe 4 controls the supply of fuel to the burner or burners of the engine. The aforesaid spring means comprises a spring 5, which acts between a diaphragm 6, forming a wall of a chamber 7, and an abutment 8, constituted by a flange on a plunger 9, which is slidable within a housing 10. The plunger 9 and hence the abutment 8 is held in a desired axial position or is adjusted by means of a control member 11, which turns pinion 12, which engages a rack 14 on the plunger 9. The diaphragm 6 carries a needle valve member 15, which controls a drain outlet 16. Fluid is admitted to the chamber 7 through an inlet pipe 17 containing a fixed restrictor 18. The chamber 7 communicates through a pipe 20 with another chamber 21, having a wall in the form of a diaphragm 22. The diaphragm 22 carries a plunger 23, which engages the pivotally-mounted arm 1. With this arrangement, the fluid pressure in the chambers 7 and 21 is substantially proportional to the force exerted by the spring 5, regardless of movement of the diaphragm 22. This results in a force, substantially unaffected by movement of the spring, being applied to the arm 1.

The arm 1 is also acted upon, indirectly in a direction opposed to the force exerted by the spring 5, by a speed signal generator, incorporating centrifugally-operable weights. This has been indicated diagrammatically at 24. The centrifugally-operable weights effect axial movement of a plunger 25, which acts on another arm 26, mounted on a pivot 27. The arm 26 carries a plunger 28, engaging a diaphragm 29, forming a wall of a chamber 30. Pressurized fluid is admitted to the chamber 30 through a pipe 31, including a restrictor 32. The fluid pressure downstream of the restrictor 32 is relieved by a half-ball valve 33, carried on the arm 26. Fluid downstream of the restrictor 32 communicates through a pipe 34 with a chamber 35, of which one wall is a diaphragm 36. This carries a plunger 37 engageable with the arm 1. With this arrangement, the fluid pressure in the chambers 30 and 35 is substantially proportional to the force exerted by the speed signal generator, i.e. the centrifugally- operable weights 24, regardless of movement of the diaphragm 36.

The present invention provides an extremely sensitive governor control; but if the arm 1 were to be acted upon by only the plungers 23 and 37, it would be unstable. To avoid this instability, the arm 1 is also acted upon by two other opposed forces, applied through fluid-operable means substantially in the manner of the plungers 39 and 43, described and illustrated in patent application Serial No. 282,708, filed May 23, 1963 (Patent No. 3,203,178). The plunger 39 is responsive to the fuel pressure applied to the burner or burners of the engine and the plunger 43 is responsive to the fuel pressure in a reservoir supplied by fuel from the same source as that acting on the plunger 39; but via a bank of restrictors, which cause a temporary pressure difference between the fluid pressures applied to the plungers 39 and 43. Eventually, the fluid pressures applied to the plungers 39 and 43 will tend to equilse; but this will only be after a time delay. In application Serial No. 282,708, filed May 23, 1963 (Patent No. 3,203,-178) the fuel supplied to the engine is gaseous; but a similar arrangement of plungers 39 and 43 can be used in liquid fuel systems. In FIGURE 1, the plungers 39 and 43 have been indicated diagrammatically, using those reference numerals. References 40 and 44 indicate respectively diaphragms on which the plungers 39 and 43 are carried. The fluid pressures applied to these diaphragms are preferably derived from sources downstream of any hysteresis-producing devices, such as the servo-piston of a pump.

Referring now to FIGURE 2, an arm 50, equivalent to the arm 1, is mounted in a cavity within a block 51, the pivot being indicated at 52. A speed signal is applied at an inlet connection 53 to a diaphragm 55, equivalent to the diaphragm 36 in FIGURE 1, the diaphragm 55 carrying a plunger 54. The remaining parts of the speed-responsive means shown in FIGURE 1, i.e., 24 to 36, do not appear in FIGURE 2. The plunger 54 extends through the diaphragm 55 and bears against the arm 50. The spring means which acts indirectly on the arm 50 comprises a spring 56, equivalent to the spring 5 in FIGURE 1. The spring 56 acts between an adjustable slide 57, similar to the member 9 in FIGURE 1, and a plunger 58 carried on a diaphragm 59, equivalent to the diaphragm 6 of FIGURE 1. The slide is held in position by a pinion 60 carried on a rod 61 and engaging a rack 62, formed on the slide. The latter is moved to adjust the loading on the spring 56 by turning the rod 61 by an arm 63. The latter parts are each equivalent to similar parts in FIGURE 1. The plunger 58 extends from the right-hand side of the diaphragm 59 and forms a valve member controlling an aperture in a seat 65 (see also FIGURE 3). The latter leads to a drain outlet 66 by which fluid can be bled from a chamber 67, equivalent to the chamber 7 in FIGURE 1. The chamber 67 is supplied with pressurised fluid through a pipe 17 through a restrictor 18 (as in FIGURE 1). Downstream of the restrictor 18, a pressure tapping is taken through a pipe 20 to an inlet 69 leading to a chamber 70, equivalent to the chamber 21 in FIGURE 1. The fluid pressure in the chamber 70 acts on a plunger 71, which is carried on a diaphragm 72. The left-hand end of the plunger 71, as viewed in FIGURE 2, extends beyond the diaphragm and engages the arm 50 in opposition to the plunger 54.

The arm 50 is also engaged by the stabilising plungers 39 and 43, carried respectively on diaphragm 40 and 44, a fluid pressure being applied to the diaphragm 40 through an inlet 41 and to the diaphragm 44 from a reservoir 45.

The arm 50 carries a half-ball valve 75, similar to 3 in FIGURE 1 and controlling an orifice in a seat, communicating with a duct 76, equivalent to the pipe 4 in FIGURE 1.

The associated plungers and diaphragms 58, 59; 39, 40; 43, 44; 71, 72; 54, 55 are all of the kind forming the subject of British patent specification No. 931,465, in which the plunger is mounted in a bearing of the recirculating ball type, permitting axial movement of the plunger, and in which the diaphragm is of cup-shape, the peripheral wall of the cup being doubled over and arranged to roll, on axial movement of the plunger, between annularly-spaced surfaces of the plunger and the chamber in which the diaphragm is supported.

What I claim as my invention and desire to secure by Letters Patent of the United States is:

1. In a fuel system of a gas turbine engine, a governor control comprising a pivotally-mounted arm, a pivot therefor, a valve member carried on said arm and controlling the fuel supply to the engine, means positioned to act on said arm at a location spaced from said pivot and thereby to turn said arm about said pivot, said means being responsive to engine speed, a chamber for containing a control fluid, inlet means for supplying said control fluid to said chamber, an outlet leading from said chamber, a valve in said outlet, first pressure-responsive means arranged to vary the pressure within said chamber and carrying said valve, second pressure-responsive means positioned to act on said arm at a location spaced from said pivot in opposition to said speed-responsive means, said second pressure-responsive means being responsive to the pressure within said chamber, and spring means positioned to act between an abutment and said first pressure-responsive means, said spring means thereby acting indirectly on said arm in a substantially rateless manner.

2. In a fuel system of a gas turbine engine, a governor control comprising a pivotally-mounted arm, a pivot therefor, a valve member carried on said arm and controlling the fuel supply to the engine, means positioned to act on said arm at a location spaced from said pivot and thereby to turn said arm about said pivot, said means being responsive to engine speed, a chamber for containing a control fluid, inlet means for supplying said control fluid to said chamber, an outlet leading from said chamber, a valve in said outlet, first pressure-responsive means arranged to vary the pressure within said chamber and carrying said valve, second pressure-responsive means positioned to act on said arm at a location spaced from said pivot in opposition to said speed-responsive means, said second pressure-responsive means being responsive to the pressure within said chamber, and spring means positioned to act between an adjustable abutment and said first pressure-responsive means, said spring means thereby acting indirectly on said arm in a substantially rateless manner.

3. A governor control as claimed in Claim 2 further comprising a pair of opposed pressure-responsive members positioned to act on said arm at locations spaced from said pivot, the aforesaid speed-responsive means and the means indirectly responsive to said spring means, a reservoir for fuel at the supply pressure, said reservoir communicating with one of said pair of opposed pressure-responsive members, and a restricted passageway connecting said reservoir to the other of said pair of opposed pressure responsive members.

4. In a fuel system of a gas turbine engine, a governor control comprising a pivotally-mounted arm, a pivot therefor, a valve member carried on said arm an controlling the fuel supply to the engine, first means positioned to act on said arm at a first location spaced from said pivot and thereby to turn said arm about said pivot, said first means being responsive indirectly to engine speed, and second means positioned to act on said arm at a second location spaced from said pivot in opposition to said first means, said second means being responsive indirectly to a resilient force, said first means comprising a pressure-responsive member positioned to act on said arm, a chamber for containing a control fluid and communicating with said pressure-responsive member, means for supplying said control fluid to said chamber, an outlet leading from said chamber, a valve in said outlet, means for varying the pressure within said chamber, and means for operating said pressure-varying means and said valve in response to engine speed, and said second means comprising a further chamber for containing a control fluid, inlet means for supplying said control fluid to said further chamber, an outlet leading from said further chamber, a valve in said outlet, first pressure-responsive means arranged to vary the pressure within said further chamber and carrying said valve, second pressure-responsive means positioned to act on said arm and responsive to the pressure within said further chamber, and spring means positioned to act between an abutment and said first pressure-responsive means, said spring means thereby acting indirectly on said arm in a substantially rateless manner.

5. A governor control as claimed in claim 3 further comprising a pair of opposed pressure-responsive members positioned to act on said arm at locations spaced from said pivot and said arm-actuating pressure-responsive members of said first and second means, a reservoir for fuel at the supply pressure, said reservoir communicating with one of said pair of opposed pressure-responsive members, and a restricted passageway connecting said reservoir to the other of said pair of opposed pressure-responsive members.

6. In a fuel system of a gas turbine engine, a governor control comprising a pivotally-mounted arm, a pivot therefor, a valve member carried on said arm and controlling the fuel supply to the engine, first means positioned to act on said arm at a first location spaced from said pivot and thereby to turn said arm about said pivot, said first means being responsive indirectly to engine speed, and second means positioned to act on said arm at a second location spaced from said pivot in opposition to said first means, said second means being responsive indirectly to a resilient force, said first means comprising a pressure-responsive member positioned to act on said arm, a chamber for containing a control fluid and communicating with said pressure-responsive member, means for supplying said control fluid to said chamber, an outlet leading from said chamber, a valve in said outlet, means for varying the pressure within said chamber, and means for operating said pressure-varying means and said valve in response to engine speed, and said second means comprising a further chamber for containing a control fluid, inlet means for supplying said control fluid to said further chamber, an outlet leading from said further chamber, a valve in said outlet, first pressure-responsive means arranged to vary the pressure within said further chamber and carrying said valve, second pressure-responsive means positioned to act on said arm and responsive to the pressure within said further chamber, and spring means positioned to act between an adjustable abutment and said first pressure-responsive means, said spring means thereby acting indirectly on said arm in a substantially rateless manner.

References Cited by the Examiner

UNITED STATES PATENTS

| | | | |
|---|---|---|---|
| 2,966,161 | 12/1960 | McCombs | 137—58 X |
| 2,987,117 | 6/1961 | Matthews | 60—39.28 X |
| 3,152,444 | 10/1964 | Peczkowski | 60—39.28 X |
| 3,173,468 | 3/1965 | McCombs | 137—26 X |

FOREIGN PATENTS

| | | |
|---|---|---|
| 817,395 | 7/1959 | Great Britain. |
| 845,269 | 8/1960 | Great Britain. |
| 888,328 | 1/1962 | Great Britain. |

WILLIAM F. O'DEA, *Primary Examiner.*

C. GORDON, *Assistant Examiner.*